(12) United States Patent
Cheng et al.

(10) Patent No.: US 11,240,542 B2
(45) Date of Patent: Feb. 1, 2022

(54) SYSTEM AND METHOD FOR MULTIPLE VIDEO PLAYBACK

(71) Applicant: Avigilon Corporation, Vancouver (CA)

(72) Inventors: Courtney Anne Adame Cheng, Coquitlam (CA); Shaun P. Marlatt, Vancouver (CA); Ompon Priebjrivat, Vancouver (CA); Scott Alexander Williams, Surrey (CA)

(73) Assignee: AVIGILON CORPORATION, Vancouver (CA)

( * ) Notice: Subject to any disclaimer, the term of this patent is extended or adjusted under 35 U.S.C. 154(b) by 468 days.

(21) Appl. No.: 15/380,321

(22) Filed: Dec. 15, 2016

(65) Prior Publication Data

US 2017/0208348 A1 Jul. 20, 2017

Related U.S. Application Data

(60) Provisional application No. 62/278,906, filed on Jan. 14, 2016.

(51) Int. Cl.
*H04N 21/2387* (2011.01)
*H04N 21/242* (2011.01)
(Continued)

(52) U.S. Cl.
CPC ....... *H04N 21/2387* (2013.01); *H04N 21/242* (2013.01); *H04N 21/4307* (2013.01); *H04N 21/4316* (2013.01); *H04N 21/47217* (2013.01); *H04N 21/84* (2013.01); *H04N 21/8456* (2013.01); *H04N 21/4542* (2013.01); *H04N 21/45457* (2013.01)

(58) Field of Classification Search
CPC ............. H04N 21/2387; H04N 21/234; H04N 21/235; H04N 21/242; H04N 21/4302; H04N 21/431; H04N 21/47217; H04N 21/8456; H04N 21/4307; H04N 21/4542; H04N 21/45457
See application file for complete search history.

(56) References Cited

U.S. PATENT DOCUMENTS

2010/0002082 A1* 1/2010 Buehler ........... G08B 13/19645
348/159
2010/0077289 A1 3/2010 Das et al.
(Continued)

OTHER PUBLICATIONS

Avigilon Control Center Client User Guide; version 4.10 Standard; 2011; 151 pages.

*Primary Examiner* — Kunal Langhnoja
(74) *Attorney, Agent, or Firm* — Daniel Hammond

(57) ABSTRACT

A system and method for playing back video feeds includes determining from the video feeds a subset of currently available video feeds, determining a playback layout based on the number of currently available video feeds and playing back the subset of currently available video feeds within the playback layout. The system and method further includes determining at least one change in availability in a given video feed of the plurality of video feeds, updating the subset of currently available video feeds based on the at least one change, updating the playback layout based on the updated subset of currently available video feeds and playing back the updated subset of currently available video feeds within the updated playback layout.

28 Claims, 13 Drawing Sheets

(51) Int. Cl.
    *H04N 21/845* (2011.01)
    *H04N 21/472* (2011.01)
    *H04N 21/431* (2011.01)
    *H04N 21/43* (2011.01)
    *H04N 21/84* (2011.01)
    *H04N 21/454* (2011.01)
    *H04N 21/4545* (2011.01)

(56) References Cited

U.S. PATENT DOCUMENTS

| | | |
|---|---|---|
| 2011/0185269 A1 | 7/2011 | Finkelstein |
| 2012/0127262 A1* | 5/2012 | Wu ................. H04N 7/152 348/14.09 |
| 2012/0198317 A1 | 8/2012 | Eppolito et al. |
| 2013/0038794 A1 | 2/2013 | Ackley et al. |
| 2013/0188923 A1 | 7/2013 | Hartley et al. |
| 2014/0046550 A1 | 2/2014 | Palmer et al. |
| 2014/0152760 A1* | 6/2014 | Granstrom ......... G06K 9/00 348/14.08 |
| 2015/0081721 A1* | 3/2015 | Ptitsyn ........... H04N 21/2187 707/748 |
| 2015/0143239 A1 | 5/2015 | Birkbeck et al. |
| 2016/0005280 A1* | 1/2016 | Laska ............ G08B 13/19682 386/230 |
| 2016/0019935 A1* | 1/2016 | Adam ................. G11B 27/34 386/223 |

* cited by examiner

SYSTEM AND METHOD FOR MULTIPLE VIDEO PLAYBACK

RELATED U.S. APPLICATION DATA

The present application claims the benefit of priority of provisional application No. 62/278,906 filed on Jan. 14, 2016, the entire contents of which are hereby incorporated by reference.

FIELD

The present subject-matter relates to the playback of a plurality of video feeds, and more particularly to the playback of the video feeds according to current availability of video of interest from the video feeds.

BACKGROUND

Playback of recorded video is one of the core operations of a camera surveillance system. The playback of recorded video may be useful to review and identify events found in the video captured by the cameras. These may then be used as evidence of those events having occurred.

However, camera surveillance systems may have a large number of cameras that are each generating its own video feed, which can make the simultaneous review of these feeds during playback cumbersome.

SUMMARY

The embodiments described herein provide in one aspect a computer-implemented method for playing back a plurality of video feeds. The method includes determining from the plurality of video feeds a subset of currently available video feeds, determining a playback layout based on the number of currently available video feeds, playing back the subset of currently available video feeds within the playback layout, determining at least one change in availability in a given video feed of the plurality of video feeds, updating the subset of currently available video feeds based on the at least one change, updating the playback layout based on the updated subset of currently available video feeds and playing back the updated subset of currently available video feeds within the updated playback layout.

The embodiments described herein provide in another aspect a system for playing back a plurality of video feeds, the system comprising a processor and a computer-readable storage device storing program instructions that when executed by the processor, cause the system to perform operations. The operations include determining from the plurality of video feeds a subset of currently available video feeds, determining a playback layout based on the number of currently available video feeds, playing back the subset of currently available video feeds within the playback layout, determining at least one change in availability in a given video feed of the plurality of video feeds, updating the subset of currently available video feeds based on the at least one change, updating the playback layout based on the updated subset of currently available video feeds and playing back the updated subset of currently available video feeds within the updated playback layout.

According to some example embodiments, determining the at least one change in availability in a given video feed of the plurality of video feeds includes discovering the start of video of interest within the given video feed and updating the subset of currently available video feeds based on the at least one change includes adding the given video feed to the subset of currently available video feeds.

According to some example embodiments, determining the at least one change in availability in the given video feed of the plurality of video feeds includes discovering a break in video of interest within the video feed at a first temporal position and updating the subset of currently available video feeds based on the at least one change comprises removing at the first temporal position the given video feed from the subset of currently available video feeds.

According to some example embodiments, determining the at least one change in availability in the given video feed of the plurality of video feeds includes discovering a resumption in video of interest within the video feed at a second temporal position being later than the first temporal position and updating the subset of currently available video feeds based on the second change further comprises re-adding at the second temporal position the given video feed to the subset of currently available video feeds.

According to some example embodiments, determining at least one change in availability in the given video feed of the plurality of video feeds includes discovering a break in video of interest within the video feed at a first temporal position and updating the subset of currently available video feeds based on the at least one change includes removing at the first temporal position the given video feed from the subset of currently available video feeds, determining whether the subset of currently available video feeds after the removing is empty, if the subset is empty, determining a second temporal position corresponding to the temporally nearest start in video of interest within any one of the plurality of video feeds, adding at the second temporal position the at least one video feed having the temporally nearest start in capturing of video to the subset of currently available video feeds, and updating the playback layout based on the updated subset of currently available video feeds includes choosing a matrix of display sub-regions corresponding to the number available video feeds after the removing or the adding.

According to some example embodiments, each of the plurality of video feeds includes video intermittently recorded by a corresponding video capture device over an interval of time, video of interest corresponds to availability of recorded video, and for a given temporal position within the interval of time, the one or more video feeds having video of interest at the given temporal position form the subset of currently available video feeds.

According to some example embodiments, each of the plurality of video feeds includes video intermittently recorded by a corresponding video capture over an interval of time and one or more events detected within the intermittently recorded video, video of interest corresponds to availability of recorded video and the presence of a detected event, and for a given temporal position within the interval of time, the one or more video feeds having video of interest at the given temporal position form the subset of currently available video feeds.

According to some example embodiments, each of the plurality of video feeds is associated to a metadata entry indicating a plurality of temporal positions of starts in video of interest for its associated video feed and a plurality of temporal positions of breaks in video of interest for its associated video feed.

According to some example embodiments, the playback layout defines a matrix of display sub-regions and playing back the currently available video feeds includes playing back each currently available video feed within one of the display sub-regions.

According to some example embodiments, playing back the updated subset of currently available video feeds within the updated playback layout includes visually displaying the currently available feeds according to the updated playback layout.

According to some example embodiments, playing back the updated subset of currently available video feeds according to the updated playback layout includes populating sub-regions of the frame area of an exported video file with the currently available video feeds.

BRIEF DESCRIPTION OF THE DRAWINGS

The detailed description refers to the following figures, in which.

Figure 1:
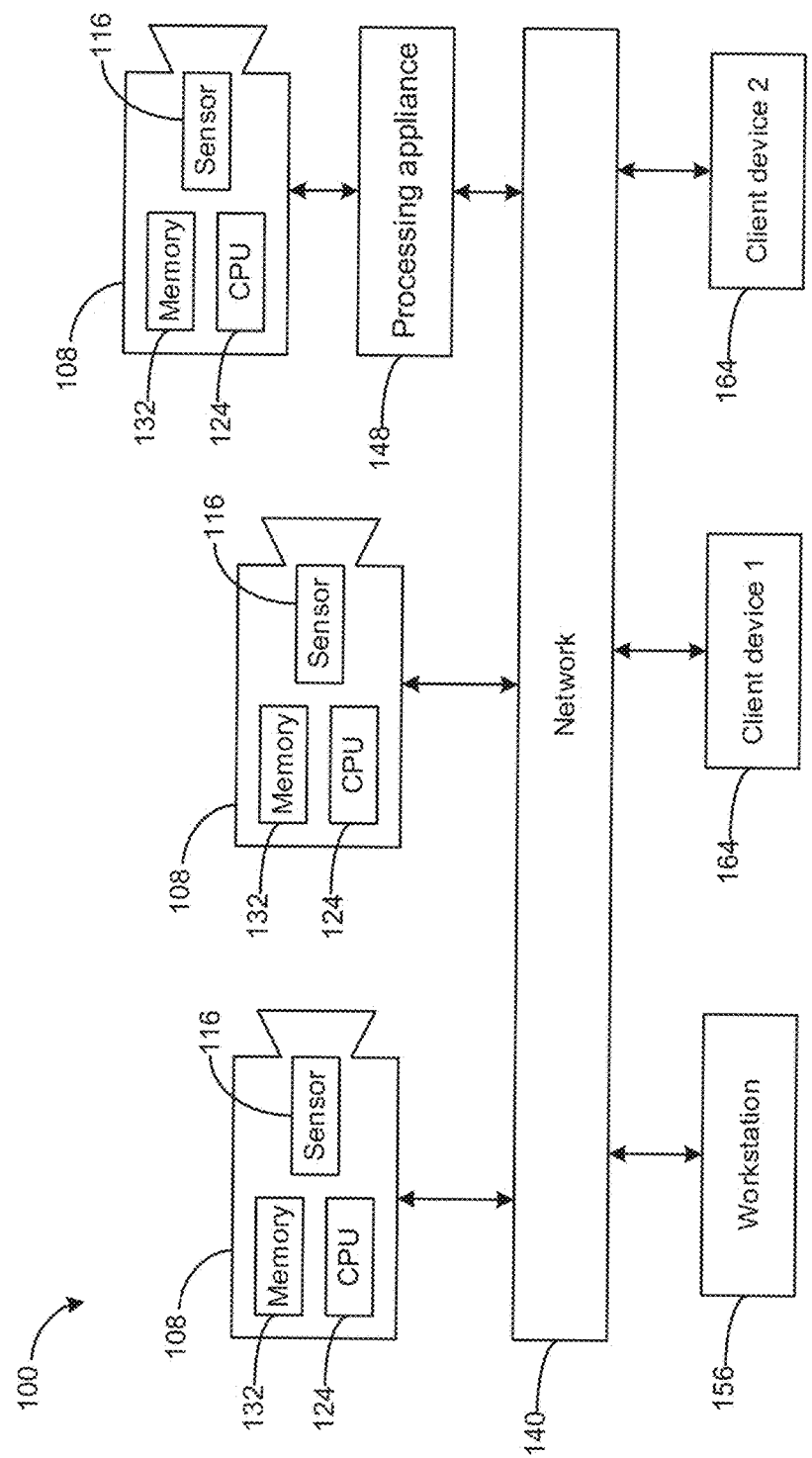
FIG. 1 illustrates a block diagram of connected devices of a video capture and playback system according to an example embodiment.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (e.g. lowered quality) and/or re-encoded image data. The processing of the image data may also cause additional information regarding the image data or objects captured within the images to be output. For example, such additional information is commonly understood as metadata. The metadata may also be used for further processing of the image data, such as drawing bounding boxes around detected objects in the image frames.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of the video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a box, pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor 124 may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 116 and the network interface may be implemented within a SOC. Furthermore, when implemented in this way, both a general purpose processor and DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, Internet) or a combination thereof. In other examples, the network 140 may include a cloud network.

In some examples, the video capture and playback system 100 includes a processing appliance 148. The processing appliance 148 is operable to process the image data outputted by a video capture device 108. The processing appliance 148 also includes one or more processor and one or more memory devices coupled to the processor. The processing appliance 148 may also include one or more network interfaces.

For example, and as illustrated, the processing appliance 148 is connected to a video capture device 108. The processing appliance 148 may be further connected to the network 140.

According to one exemplary embodiment, and as illustrated in FIG. 1, the video capture and playback system 100 includes at least one workstation 156 (e.g. server), each having one or more processors. The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (e.g. mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to play_back the received image data. A client device 164 may also have functionalities for processing image data. For example, processing functions of a client device 164 may be limited to processing related to the ability to play_back the received image data. In other examples, image processing functionalities may be shared between the workstation and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 2:
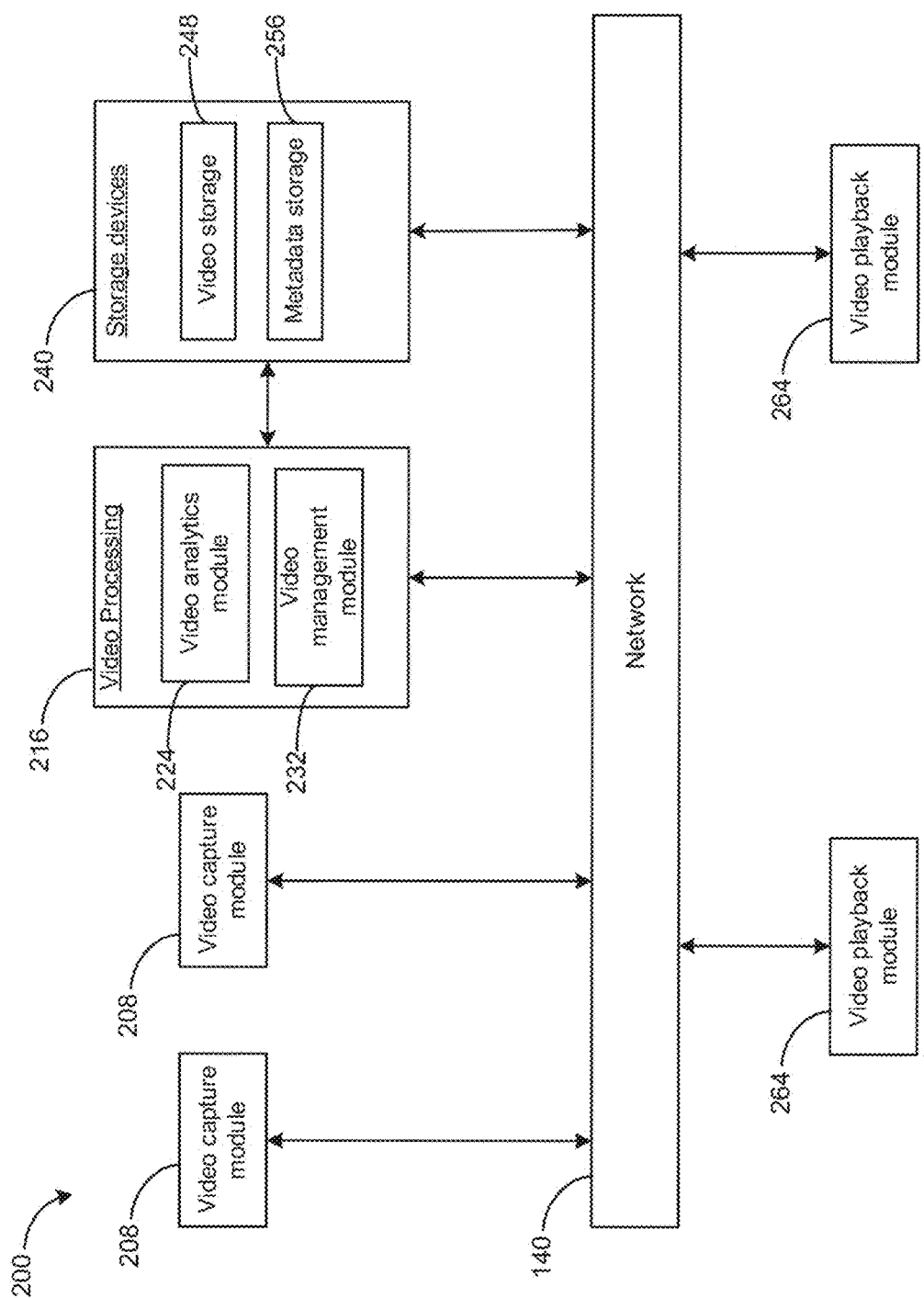
FIG. 2 illustrates a block diagram of a set of operational modules of the video capture and playback system according to one example embodiment.

Referring now to FIG. 2, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1.

The set 200 of operational modules includes at least one video capture module 208. For example, each video capture device 108 may implement a video capture module 208. The video capture module 208 is operable to control one or more components (e.g. sensor 116, etc.) of a video capture device 108 to capture images The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind", monitoring objects (i.e. to protect from stealing), and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules include a video storage module 248 and a metadata storage module 256. The video storage module 248 stores image data, which may be image data processed by the video management module 232. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data from each capture device 108 and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 3:
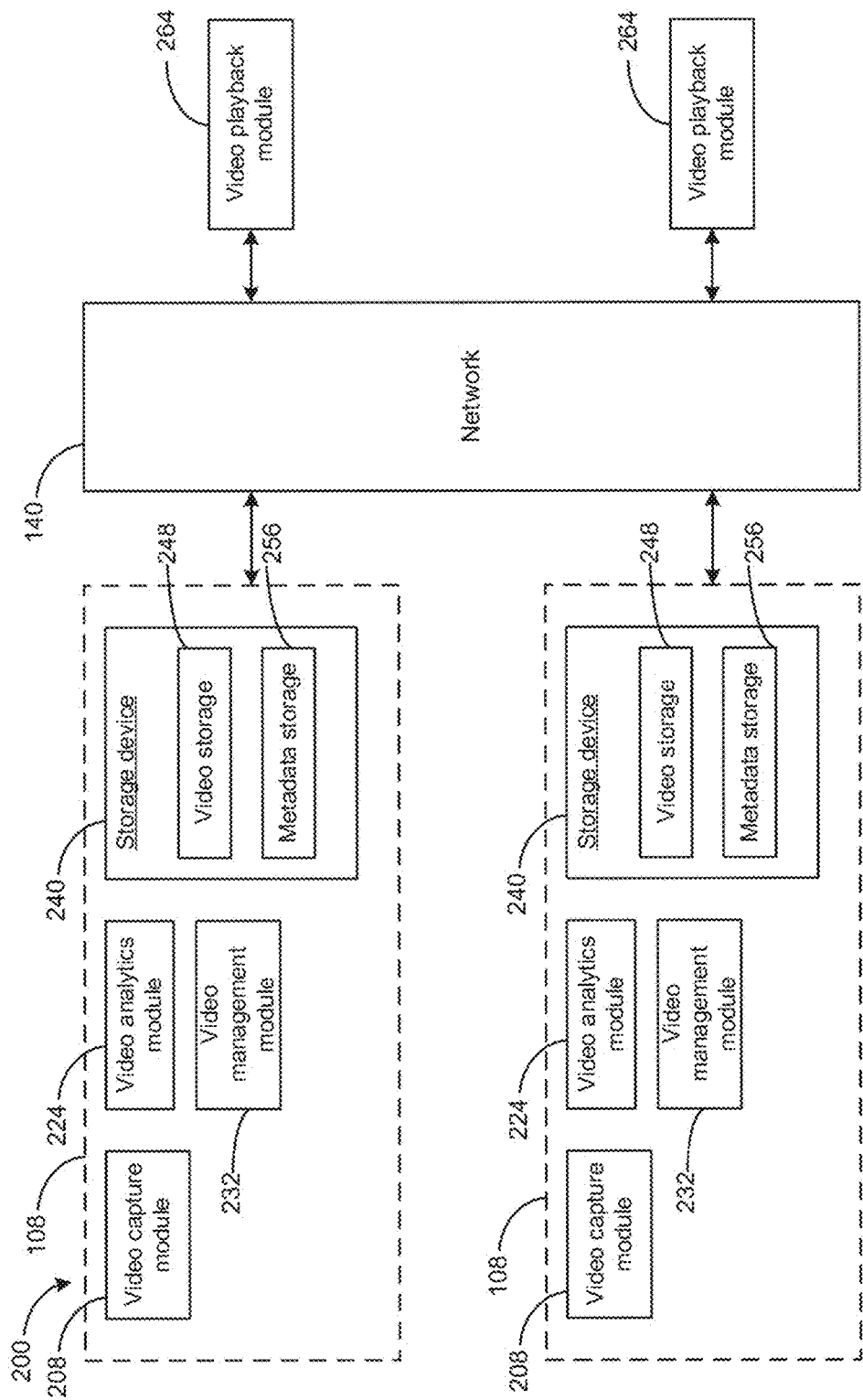
FIG. 3 illustrates a block diagram of a set of operational modules implemented within one device according to one example embodiment.

Referring now to FIG. 3, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Accordingly, the video capture and playback system 100 may not require a workstation 156 and/or a processing appliance 148.

As described elsewhere herein image data is produced by each of the video capture devices 108. According to various examples, the image data produced is video data (i.e. a plurality of sequential image frames). The video data produced by each video capture device is stored as a video feed within the system 100. A video feed includes segments of video data that have been recorded intermittently. Intermittently recorded video refers to the carrying out of recording of video data produced by a video capture device 108 over an interval of time wherein some of the video data produced by the video capture device 108 is not recorded. Video data produced while recording is being carried out is stored within the system 100 (e.g. within video storage module 248). Video data produced while recording is not being carried out is not stored within the system 100.

For example, whether video data produced by a video capture device 108 is recorded is determined based a set of one or more rules. For example, video data may be recorded based on presence of a feature in the scene captured within the video, such as motion being detected. Alternatively, or additionally, video data may be recorded based on a predetermined recording schedule. Video data may also be selectively recorded based on a command from an operator.

For example, over the interval of time, a first sub-interval of time during which recording for a video capture device is being carried out results in a first segment of video data to be stored. This stored segment of video data includes the plurality of sequential images produced by the video capture device 108 during the first sub-interval of time.

Over a second sub-interval of time during which recording is not being carried out, the produced plurality of images are not stored. Accordingly this image data is lost.

Over a third sub-interval of time during which recording for the video capture device is being carried out again results in another segment of video data to be stored. This stored segment of video data includes the plurality of sequential images produced by the video capture device 108 during the third sub-interval of time.

Accordingly, the video feed for a given video capture device 108 is formed of the one or more segments of video data that are stored as a result of the intermittent recording of video data produced by the given video capture device 108.

The video feed for the given video capture device 108 may be associated with a metadata entry. The metadata entry includes one or more indicators that indicate temporal positions of the beginning and end of each video data segment of the video feed. The temporal position indicates the time at which a beginning or end of video data segment occurred. For example, the temporal position may indicate the real-world time at which the beginning or end of a video data segment occurred.

According to some example embodiments, the metadata entry may further include a plurality of indicators that indicate the temporal positions of the beginning and end of one or more events detected within the stored video data segment of a video feed. The events may be detected from the analyzing of the video data, such as by the video analytics module 224. Events detected may include the detecting presence of a person, object or vehicle, the appearance of an anomaly, the crossing of a tripwire, the breach of a perimeter, the number of persons in one area, whether an object has been "left behind" or whether an object has been removed. The temporal position may also indicate the real-world time at which the beginning or end of each event occurred.

Figure 4:
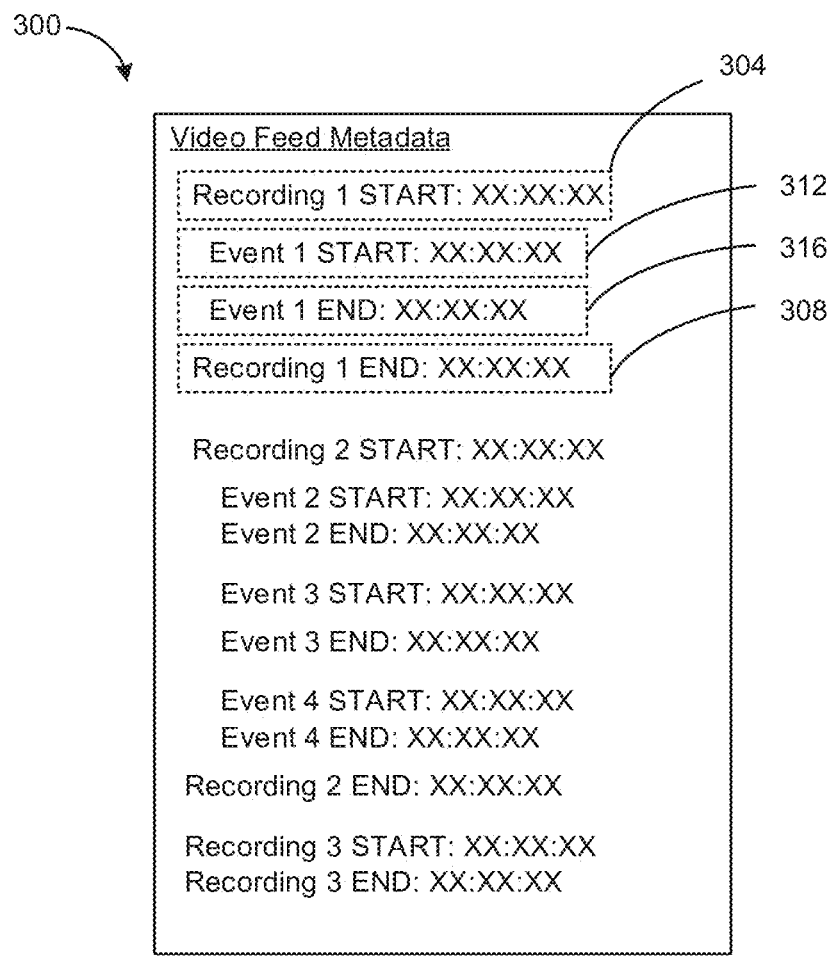
FIG. 4 illustrates a schematic diagram of an example metadata entry associated to a video feed for a video capture device.

Referring now to FIG. 4, therein illustrated is a schematic diagram of an example metadata entry 300 associated to a video feed for a video capture device 108. In the illustrated example, a first recording start indicator 304 provides the temporal position of the start of a first video data segment and a first record end indicator 308 provides the temporal position of the end of the first video data segment. Within the first video data segment, a first event start indicator 312 provides the temporal position of the start of a first event detected within the video feed and a first event end indicator 316 provides the temporal position of the end of a first event detected within the video feed. It will be appreciated additional indicators in the metadata entry 300 define the start and end of two other video data segments and 3 other events.

Figure 5:
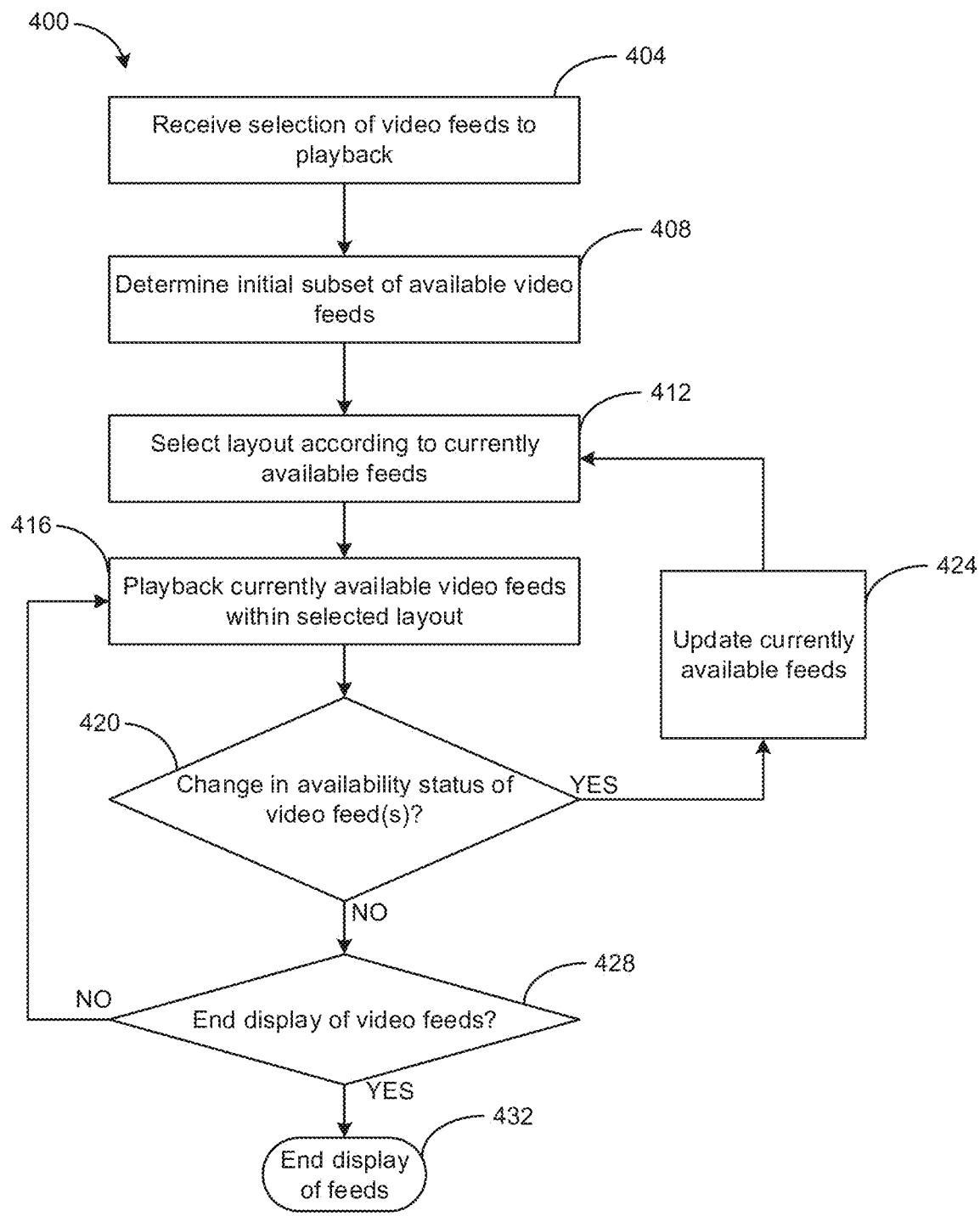
FIG. 5 illustrates a flow chart diagram of an example embodiment of a method for playing back a plurality of video feeds.

Referring now to FIG. 5, therein illustrated is a flow chart diagram of an example embodiment of a method 400 for playing back a plurality video feeds captured from a plurality of video capture devices 108.

Playing back the plurality of video feeds may include visually displaying image frames of the video feeds on a display device, such as the display device of a client device 164.

Playing back the plurality of video feeds may also include exporting the video feeds to a video file wherein the plurality of video feeds are displayed simultaneously within the image frames of the exported video file. The exported video file may then be played back on any other compatible devices to visually display image data captured by the video capture devices 108 without having to access the video feed stored within the system 100.

At 404, the selection of a set of a plurality of video feeds to be played back is received. The selection may be made by an operator interacting with a user interface displayed on a client device 164. The operator may select the plurality of video feeds to be played back, for example, by selecting the feeds from a list of video capture devices 108 for which video feeds are available. Alternatively, the operator may select one or more groups of video capture devices 108, whereby selecting of one group causes a plurality of video feeds from the video capture devices 108 belonging to that group to be selected. In other examples, the set of plurality of video feeds may be all the video feeds of the system 100, all of the video feeds within a site family, or all of the video feeds within a site.

The selection of the set of plurality of video feeds to be played back at 404 may also include the selection of an interval of time. Accordingly, the portions of the selected video feeds falling within the selected interval of time will be played back.

At 408, an initial subset of currently available video feeds from the plurality of video feeds is determined. For example, the initial subset of currently available video feeds corresponds to those video feeds from the plurality of video feeds for which there is video of interest available at the start of the selected interval of time.

According to various example embodiments, video of interest being available for a given video feed at a given temporal position corresponds to the video feed having recorded video at that temporal position. Whether there is recorded video at that temporal position may be determined based on the information contained in the metadata entry associated to the video feed. For example, it may be determined that there is recorded video at the temporal position if that temporal position is immediately preceded by a recording start indicator 304 and is immediately followed by a recording end indicator 308 (while not taking into account any event start indicators or any event end indicators).

According to various example embodiments, video of interest being available for a given video feed at a given temporal position corresponds to the video feed having recorded video and an event being detected at that temporal position. The event being detected may be one or more specific types of events specified by an operator. This determination may also be made based on the metadata entry associated to the video feed.

It will be understood that various examples are presented herein for video of interest being available when the given video feed at a given temporal position corresponds to the video feed having recorded video at that temporal position, but that these examples may also be applicable for where video of interest being available corresponds to the given video feed at the given temporal position having recorded video and an event being detected at that temporal position.

At 412, a playback layout is determined based on the number of currently available video feeds. An initial playback layout may be determined based on the number of currently available video feeds within the initial subset of currently available video feeds determined at 408.

At 416, the subset of currently available video feeds is played back within the playback layout determined at 412. Whether a currently available video feeds is played back within the playback layout is determined based on the availability of video of interest at a current temporal position. The current temporal position starts at a temporal position corresponding to the start of the selected interval of time and is progressively advanced during playback. Image frames of the subset of currently available video feeds corresponding to the current temporal position are played back (e.g. visually displayed on the display device and/or included within image frames of the exported video file). It will be appreciated that where more than one video feeds are available for a given current temporal position, the playing back of the video feeds is synchronized in time. That is, the image frames from the more than one video feeds being simultaneously played back all correspond to the same temporal position. For example, synchronization of the video feeds may be implemented according to the teachings of U.S. Pat. Publ. No. 2016/0019935, ("TIMELINE SYNCHRONIZATION CONTROL METHOD FOR MULTIPLE DISPLAY VIEWS"), which is hereby incorporated by reference in its entirety.

At 420, as the currently available video feeds are played back, it is determined whether a change in the subset of currently available video feeds has occurred. A change in the subset of currently available video feeds may occur when video of interest in a given video feed of the plurality of selected video feeds becomes available where video of interest in the given video feed was previously unavailable. This may correspond to discovering the start in the availability of video of interest in the given video feed. This may also occur when the advancing of the current temporal position in time during the playing back of video feeds arrives at a temporal position corresponding with the start of a recorded video data segment for that video feed.

A change in the subset of currently available feeds may also occur when video of interest in a given video feed of the plurality of selected video feed becomes unavailable where video of interest in the given video feed was previously available. This may correspond to discovering a break in the availability of video interest in the given video feed. This may occur when the advancing of the current temporal position in time during the playing back of video feeds arrives to a temporal position corresponding with the end of a recorded video data segment for that video feed.

At 420, if there is no change in the subset of currently available video feeds, the playing back of the current subset of available video feeds is continued at 416.

If there is a change in the subset of currently available video feeds, the method proceeds to 424 to update the subset of currently available video feeds in accordance with the change in availability of video of interest.

For example, where the change in the currently available feeds is the discovery of the start in video of interest in a given video feed, the subset of currently available video feeds is updated by adding the given video feed to the subset.

For example, where the change in the currently available feeds is the discovery of the break in video of interest in a given video feed, the subset of currently available video feeds is updated by removing the given video feed from the subset.

After updating the subset of currently available video feeds, the method returns to 412 to update the playback layout based on the subset of available video feeds updated at 424. For example, an updated playback layout is determined based on the number of available video feeds within the most up-to-date subset of available video feeds.

It will be appreciated that as video data from the plurality of video feeds is played back, the playback layout is automatically adjusted based on changes in availability of video of interest such that the playback layout chosen at any given temporal position of the selected interval of time is appropriate for the number of video feeds having available video of interest at that current temporal position.

At 428, it is determined whether the playing back of the plurality of video feeds is to be ended. The playback may be ended if the end of the interval of time for which the selected plurality of video feeds is to be displayed has been reached. The displaying may also be ended in response to an external command, such as a command provided by an operator interacting with a user interface displayed on a client device 164.

It will be appreciated that over the selected interval of time for which the plurality of video feeds are to be displayed, an individual video feed of the plurality may be added to the subset of currently available video feeds, then removed from this subset, and subsequently added again to the subset based on changes of availability of video of interest for that video feed. For example, as the current temporal position is advanced during the playback, it may arrive to a first temporal position corresponding to a break in the video of interest for a given video feed that currently belongs to the subset of currently available video feeds. This causes the given video feed to be removed from the subset such that the video feed is no longer played back within the playback layout. At a second temporal position that is later than the first temporal position, there is a resumption in the video of interest from the given video feed, which causes the given video feed to be re-added at the second temporal position to the subset of currently available video feeds. Accordingly, the given video feed is again played back within the playback layout.

According to some example embodiments, the determining of whether a change in the subset of currently available video feeds has occurred at 420 is carried out by monitoring each of the video feeds as the current temporal position is advance to discover if a change in availability in video of interest has occurred in any of the video feeds. For example, as the current temporal position is advanced in time, each video feed is monitored to determine whether the current temporal position corresponds to the temporal position of a start in video of interest or break in video of interest.

According to other example embodiments, the determining of whether a change in the subset of currently available video feeds has occurred at 420 is carried by determining for each video feed the temporal position of its next change in availability of video of interest. This determining is made ahead of the playback of the video feed arriving at the temporal position of the next change. Accordingly, the determining of whether a change in availability has occurred for the given video feed is carried out by determining whether temporal position of the next change has been reached during the playing back of the plurality of selected video feeds. The determining of the temporal position of the next change in availability of video of interest for a given video feed may be made by examining the metadata entry associated to that video feed.

For example, while a given video feed currently has available video of interest, the temporal position of the next time that video of interest for the given video feed becomes unavailable (i.e. next break in video of interest) is determined. This may correspond to the end of the current video data segment of the given video feed that is currently being played back. Accordingly, when the temporal position of the end of the current video data segment is reached, the subset of currently available video feeds is updated by removing the given video feed from the subset. Furthermore, the temporal position of video of interest becoming available again (i.e. next start in video of interest) is determined so as to track when the given video feed should be re-added to the subset of currently available video feeds.

Similarly, while a given video feed currently does not have available video of interest, the temporal position of the next time that video of interest for the given video feed becomes available is determined. This may correspond to the start of the next video data segment of the given video feed. Accordingly, when the temporal position of the start of the next video data segment is reached, the subset of currently available video feeds is updated by adding the given video feed to the subset. Furthermore, the temporal position of video of interest becoming unavailable is determined so as to track when the given video feed should be removed from the subset of currently available video feeds.

Figure 6:
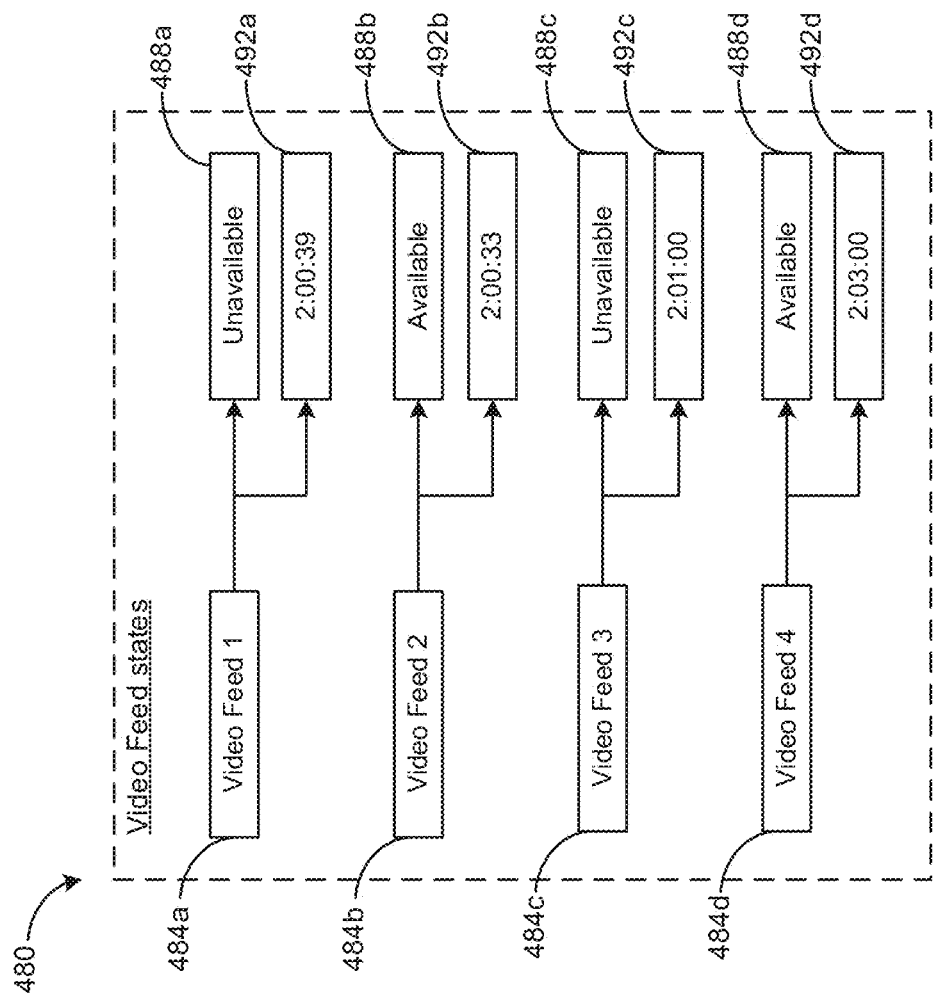
FIG. 6 illustrates a schematic diagram of a data structure according to one example embodiment for tracking the current availability status of video of interest within the plurality of video feeds.

Referring now to FIG. 6, therein illustrated is a schematic diagram of a data structure 480 for tracking the current availability status of video of interest and the temporal position of the next change in availability status for each of the plurality of video feeds selected to be played back. It will be understood that the data structure 480 provides information about the status of the plurality of video feeds at the current temporal position and that the status may change as the video feeds are played back and the current temporal position is advanced in time. In the illustrated example, four video feeds are selected for playback. However, it will be understood that in other examples any number of video feeds that is equal or greater than two video feeds may be played back.

A plurality of video feed identifiers 484*a*, 484*b*, 484*c*, and 484*d* identify each of the video feeds selected for playback. Each video feed identifier is associated to an availability indicator entry that indicates whether video of interest is currently available for each of the video feed. In the illustrated example, a first availability indicator entry 488*a* indicates that the current status of the first video feed 484*a* is video of interest is not available, a second availability indicator entry 488*b* indicates that the current status of the second video feed 484*b* is video of interest is available, a third availability indicator entry 488*c* indicates that the current status of the third video feed 484*c* is video of interest is not available, and a fourth availability indicator entry 488*d* indicates that the current status of the fourth video feed 484*d* is video of interest is available.

Accordingly, the availability indicator entries 488*a* to 488*d* identify the video feeds that form the subset of current availabilities video feeds. In the example illustrated in FIG. 6, the second and fourth video feeds 484*b*, 484*d* that currently have available video of interest belong to the subset of current available video feeds and the video data from the second and fourth video feeds 484*b*, 484*d* are currently being played back with the playback layout determined at 412.

According to various example embodiments, and as illustrated, each video feed identifier is associated to a next change time entry that indicates the temporal position of the next change in availability status for its respective video feed. In the example illustrated in FIG. 6, a first next change time entry 492*a* for the first video feed 484*a* indicates that the next change in availability status will occur at the temporal position "2:00:39". Since video of interest is currently not available for the first video feed 484*a*, the next change in availability status corresponds to video of interest being available again. Accordingly, when the current temporal position reaches the temporal position "2:00:39", the first video feed 484*a* is added to the subset of currently available video feeds, the playback layout is updated and the first video feed is played back within the updated playback layout.

In the illustrated example, a second change time entry 492*b* for the second video feed in the next change in availability status will occur at the temporal position "2:00:33". Since video of interest is currently available for the second video feed 484*b*, the next change in availability status corresponds to video of interest becoming unavailable. A third change time entry 492*c* for the third video feed in the next change in availability status will occur at the temporal position "2:01:00". Since video of interest is currently not available for the third video feed 484*c* the next change in availability status corresponds to video of interest becoming available. A fourth change time entry 492*d* for the fourth video feed in the next change in availability status will occur at the temporal position "2:03:00". Since video of interest is currently available for the fourth video feed 484*d*, the next change in availability status corresponds to video of interest becoming unavailable.

Figure 7:
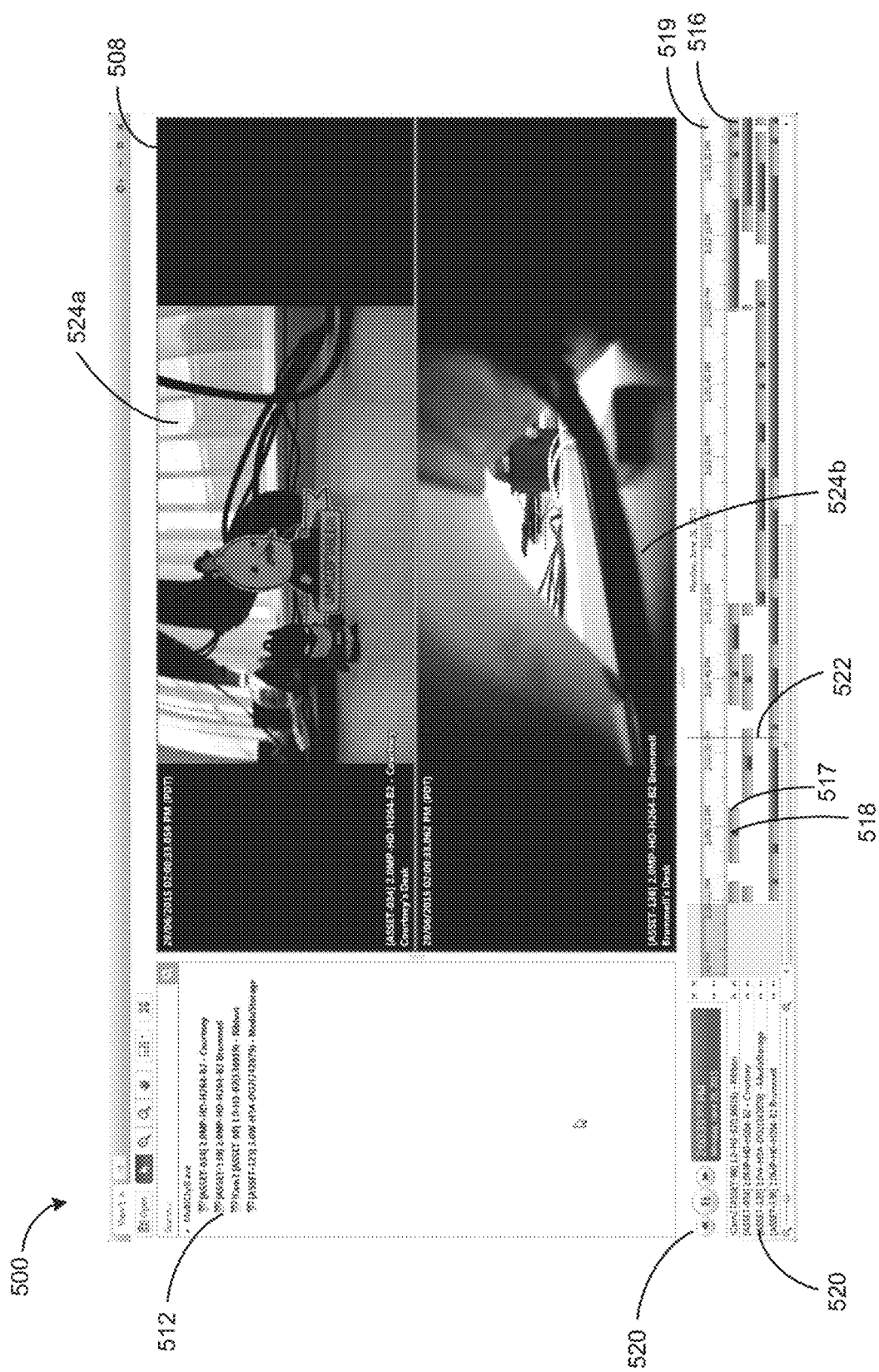
FIG. 7 illustrates a visual representation of a playback interface according to one example embodiment for playing back video data from the plurality of video feeds at a first example temporal position.

Referring now to FIG. 7, therein illustrated is a visual representation of a playback interface 500 for playing back video data from the plurality of video feeds at a first temporal position according to one example embodiment. In the example embodiment, the plurality of video frames are being played back by visually displaying image frames of the video feeds on the display device. For example, the display device may also be displaying the playback interface 500. Accordingly, the playback interface 500 includes a display region 508 for visually displaying the subset of currently available video feeds being played back.

The playback interface 500 may further display a listing 512 of video feeds. The listing 512 may be operative to display the identifiers of all of the video feeds that have been selected for played back.

The playback interface 500 may further display a plurality of graphical timelines 516. Each graphical timeline 516 is associated to a video feed from the plurality of video feeds selected to be displayed. Each graphical timeline 516 may provide graphical indicators of availability video of interest within its associated video feed. For example, and as illustrated, a graphical timeline 516 may include a first graphical bar 517 representing when recorded video is available for the video feed. The graphical time line 516 may also include a second graphical bar 518 representing when an event was detected for the video feed. It will be appreciated that the second graphical bar 518 may overlap with the first graphical bar 517. Segments where a graphical bar is absent indicates when recorded video is not available for the video feed. A temporal legend 519 provides indications of temporal positions. For example, the graphical timelines for each video feed may be generated from the metadata entry 300 associated to that video feed.

In the illustrated example, four video feeds identified as "Ribbon", "Courtney", "Mediastorage", and "Brummell" are selected as the plurality of video feeds to be played back. A graphical timeline 516 is displayed for each of the video feeds. The graphical timelines 516 for each video feeds are arranged with respect to the temporal legend 519 so as to be synchronized in time with one another. Identifiers 520 of each of the selected video feeds are displayed to identify each of the graphical timelines 516.

According to various example embodiments wherein the video feeds are played back by visually displaying image frames of the video feed on a display device, the playback layout determined at 412 defines the division of the display region 508 into a matrix having at least one sub-region. Each sub-region is associated to a respective one of the subset of currently available video feeds and image frames of that video feed are visually displayed within the sub-region when the video feed is played back. For example, when the playback layout is updated due to a change in availability of video of interest, the division of the display region is also updated to a different matrix to suit the new number of currently available video feeds. Accordingly, when playing back all of the video feeds, "playing back the subset of currently available video feeds within the playback layout", or variants thereof, refers to visually displaying the image frames of the currently available video feeds within the sub-regions of the display regions 508 as defined by the playback layout. It will be understood that video feeds that do not currently have available video of interest continue to be played back generally but are not played back within the playback layout because their image frames are not currently being visually displayed within a sub-region of the display region 508.

In the example illustrated in FIG. 7, the current temporal position (as indicated by current temporal position indicator 522) has arrived at temporal position "2:00:33 PM". At this temporal position, the second and the fourth video feeds have video of interest available. Accordingly, a playback layout defining a matrix having two sub-regions is selected for visually displaying the subset of two currently available video feeds. In the illustrated example, the matrix is a 2×1 (height by width) arrangement of sub-regions. The video data from the second feed is displayed within a first sub-region 524*a* and the video data from the fourth feed is displayed within a second sub-region 524*b*. It will be appreciated that the first and third video feeds that do not have available video of interest is not currently being visually displayed.

It will be understood that the data structure 300 of FIG. 4 corresponds to the playback status represented in FIG. 7 at temporal position "2:00:33 PM".

Figure 8:
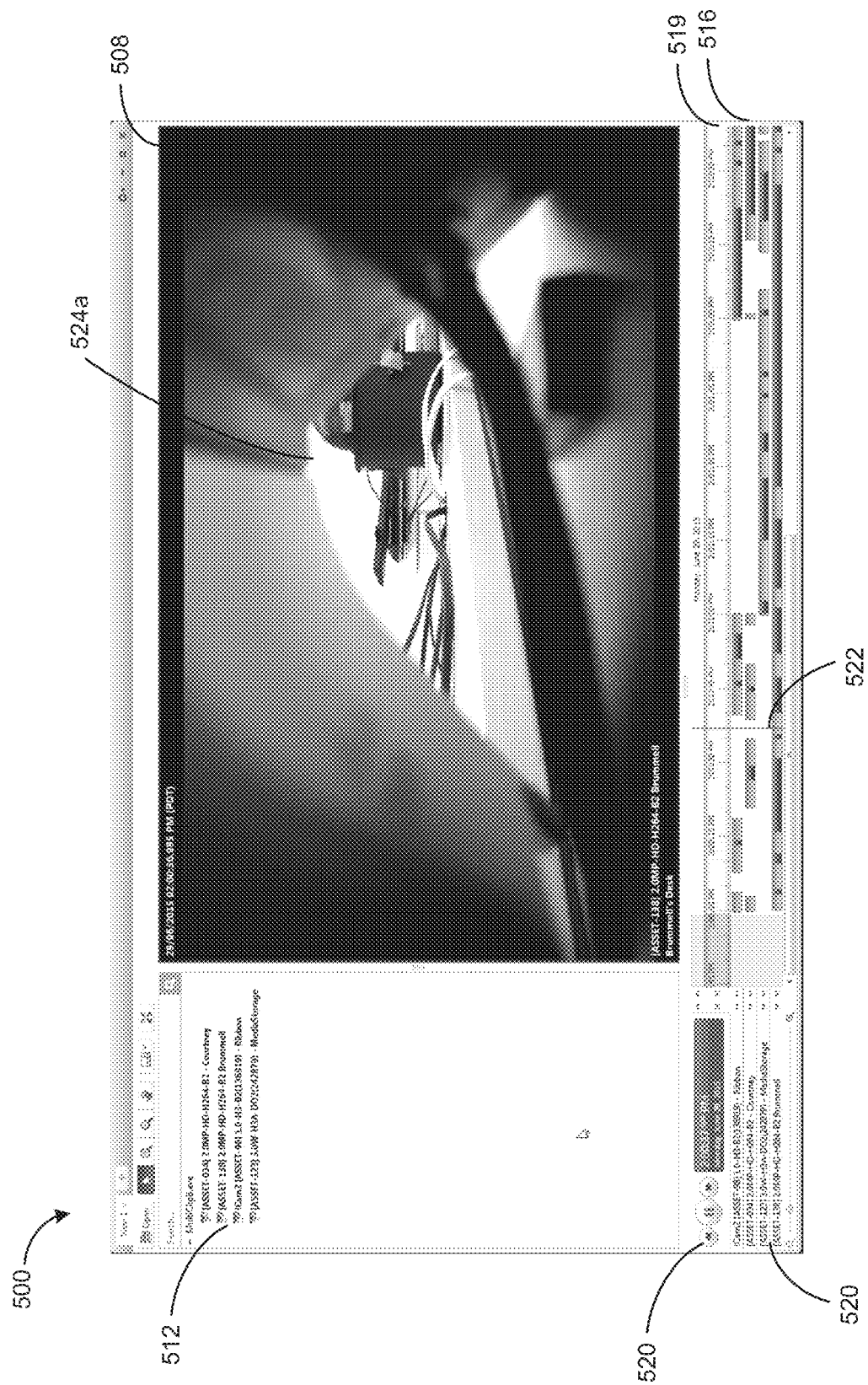
FIG. 8 illustrates a visual representation of a playback interface according to one example embodiment for playing back video data from the plurality of video feeds at a second example temporal position.

Referring now to FIG. 8, therein illustrated is a visual representation of a playback interface 500 for playing back video data from the plurality of video feeds in which the current temporal position has advanced to a second temporal position according to the example embodiment. The second temporal position, as indicated by current temporal position indicator 522, has a value of "2:00:37 PM". At this temporal position, only the fourth video feed has available video of interest. It will be appreciated that previously at temporal position 2:00:35 PM, there was a break in the video of interest from the second video feed. As a result, the playback layout was updated to account for the removal of the second video feed from the subset of currently available video feeds. The playback layout selected for the second temporal position defines a matrix having a single sub-region 524a. For example, and as illustrated, the single sub-region 524a corresponds to the entire display region 508.

Figure 9:
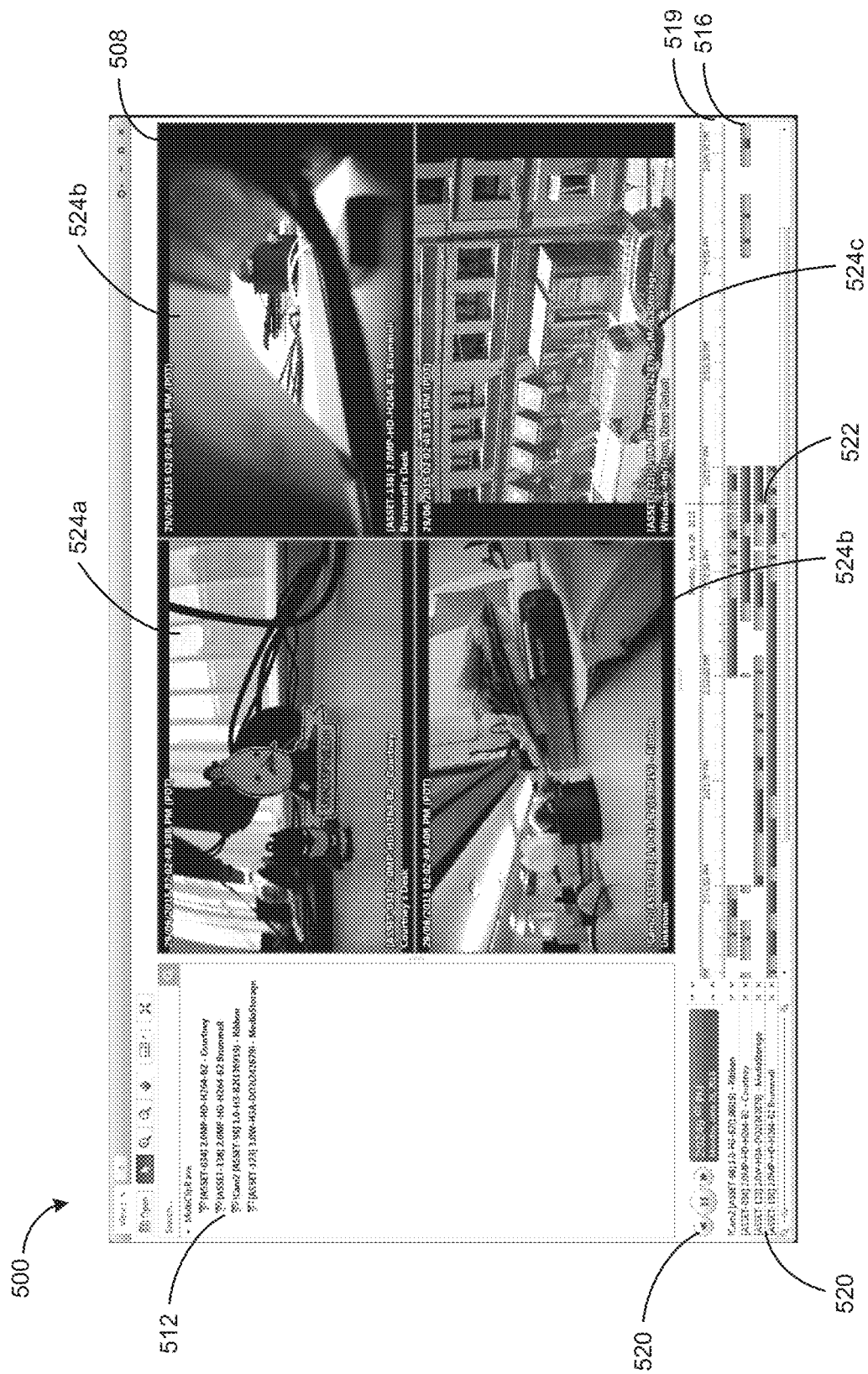
FIG. 9 illustrates a visual representation of a playback interface according to one example embodiment for playing back video data from the plurality of video feeds at a third example temporal position.

Referring now to FIG. 9, therein illustrated is a visual representation of the playback interface 500 for playing back video data from the plurality of video feeds in which the current temporal position has advanced to a third temporal position according to the example embodiment. The third temporal position has a value "2:02:39 PM". At this temporal position, all four video feeds have available video of interest. As a result, the playback layout updated at 412 defines a matrix having four sub-regions 524a, 524b, 524c and 524d. For example, and as illustrated, the matrix is a 2×2 arrangement. Each of the sub-regions 524a, 524b, 524c, and 524d visually displays one of the four video feeds.

According to various example embodiments where the video feeds are played back by visually displaying video data of the video feeds on a display device, the display region 508 corresponds to the portion of the screen area of the display device allocated for displaying the subset of currently available video feeds.

According to other example embodiments wherein the plurality of video feeds are played back by exporting the video feeds to a video file, the exported video file has a predetermined resolution (e.g. defined by a number of height pixels and a number of width pixels). As the current temporal position is advanced during playback, video data from the subset of currently available video feeds populate image frames of the exported video file. Accordingly, the playback layout define the division of the frame area having the predetermined resolution of the exported video file into sub-regions. Each sub-region is associated to a respective one of the subset of currently available video feeds and the image frames of that video feed populate that sub-region of the frame area.

It will be appreciated that in both situations, the display region 508 is defined by its resolution. In the case of playing back the video feeds by visually display video data, the display region 508 corresponds to the portion of the viewable area of the display device that is allocated for visually displaying the video feeds. This portion of the viewable area can be defined by a resolution (e.g. number of width pixels and number of height pixels), which may be based on the overall display resolution of the display device playing back the video feeds. In the case of exporting to a video file, the display region 508 corresponds to the resolution (e.g. number of width pixels and number of height pixels) of the video file to be exported.

Figure 10:
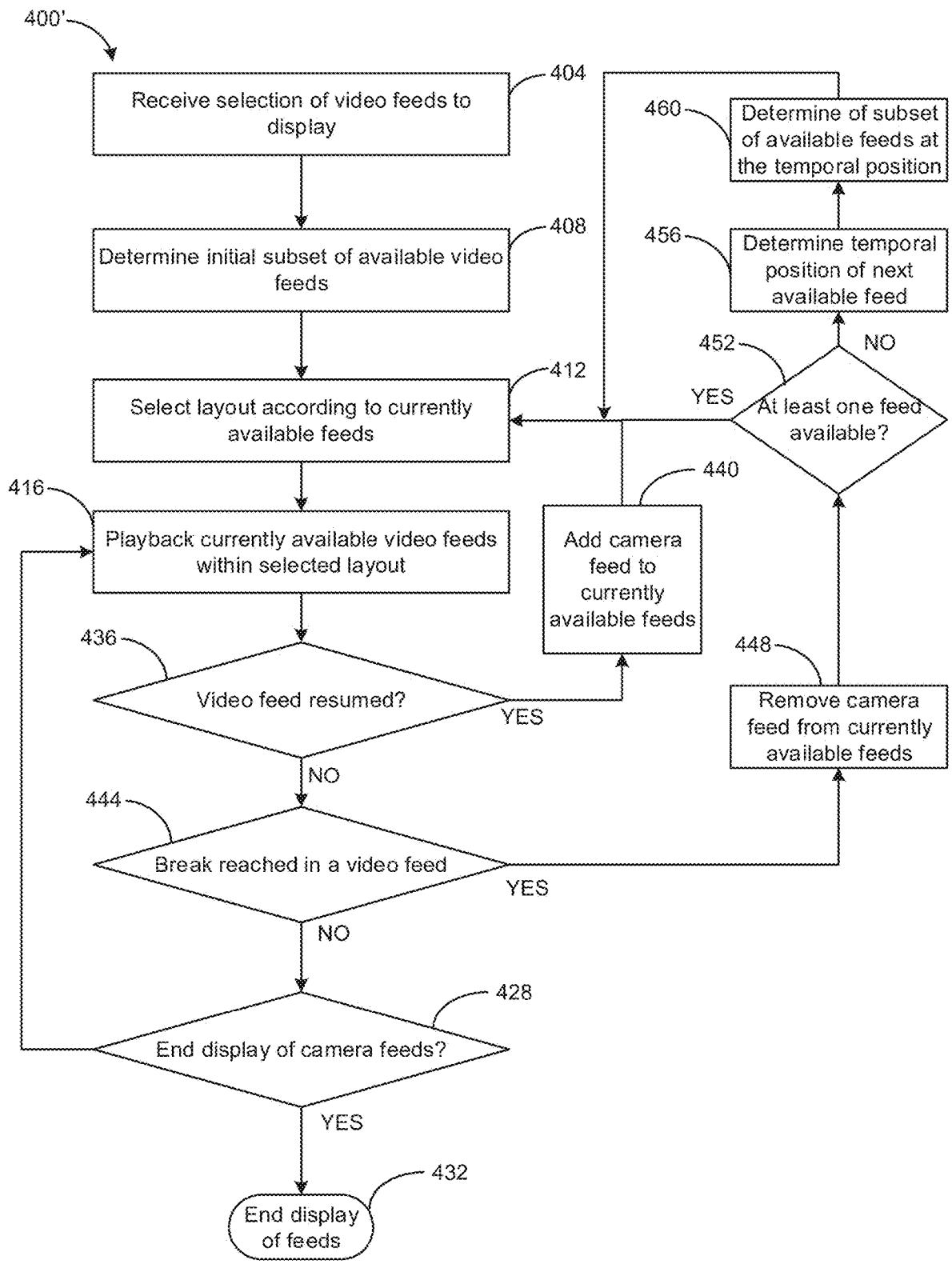
FIG. 10 illustrates a flow chart diagram of an example alternative embodiment of a method for playing back a plurality of video feeds.

Referring now to FIG. 10, therein illustrated is a flow chart diagram of an example alternative embodiment of a method 400' for displaying a plurality of video feeds from a plurality of video capture devices 108. The example alternative method 400' is similar to example method 400 described herein and the description provided with respect to example method 400 is applicable to the alternative example 400'.

With respect to example method 400, the example alternative method 400' contains the additional operations of skipping ahead when there are no video of interest available.

Operations 404 to 416 of alternative example method 400' correspond to operations 404 to 416 of method 400 and the description provided for the example method 400 is also applicable to the method 400'.

At step 436, it is determined whether there has been a start in video of interest in a video feed that previously did not have video of interest available. This may occur when the advancing of the current temporal position in time during the playing back of video feeds arrives to a temporal position corresponding with the start of a recorded video data segment for that video feed.

If there has been a start in video of interest in a given video feed, the subset of currently available video feeds is updated at step 440 by adding the given video feed to the subset and the method 400' further proceeds to return to 412 to update the playback layout.

At step 444, it is determine whether there has been a break in the video of interest in a video feed that currently has available video of interest. This may occur when the advancing of the current temporal position in time during the playing back of video feeds arrives at a temporal position corresponding with the end of a recorded video data segment for that video feed.

If there has been a break in video of interest in a given video feed, the subset of currently available video feeds is updated by removing at step 448 the given video feed from the subset.

It will be appreciated that steps 436, 440, 444 and 448 substantially correspond to the determining of a change in availability status of the plurality of video feeds selected for playback at 420 and the updating of the set of currently available video feeds at 424 of example method 400.

According to the alternative example embodiment 400', after removing the given video feed from the subset of currently available video feeds at 448, it is further determined at 452 whether there remains at least one currently available video feed or whether the subset of currently available video feed is now empty. For example, the subset of currently available video feeds being empty can correspond to the availability indicator entries 488a to 488d each indicating that video of interest is not available.

If there is at least one video feed remaining, the method 400' proceeds to 412 to update the display layout to accommodate those video feeds that still remain within the subset of currently available video feeds.

If there are no more currently available video feed remaining at the temporal position at which the given video feed was removed from the subset at 448, the alternative method 400' proceeds to step 456 to determine the temporal position of the video feed amongst the plurality of video feeds selected for playback that has the nearest temporally start in video of interest. That is, it is determined which video feed resumes video of interest the soonest after the subset of currently available video feeds became empty. For example, according to various example embodiments wherein a data structure 400 is used to track the current availability status of video of interest and the temporal position of the next change in availability status, the video feed that is associated with next change time entry having the soonest temporally value is identified as the video feed having the soonest resumption of video of interest.

At step 460, the subset of currently available video feeds is determined for the temporal position corresponding to the nearest temporally start in video of interest. Typically, only one video feed (i.e. the video feed having the soonest resumption of video of interest) will be available. However, in some examples, video of interest may simultaneously resume in two or more video feeds.

After step 460, the alternative method 400' proceeds to step 412 to update the playback layout for the subset of currently available video feeds identified at step 460 and the video feeds of this subset is displayed at 416 according to the updated display layout.

According to various example embodiments, the determining of the temporal position of temporally nearest start of video interest at step 456 and the determining of the subset of available feeds at that temporal position at 460 is carried out immediately after removal of the camera feed at 448. Accordingly, the playback of video feeds appears to be continuous even though there was a temporal gap in which no video of interest was available for playback. That is, when a temporal position is reached in which there are no video of interest, the playback of video feeds immediately skips ahead temporally to the next temporal position at which there is some video of interest to be played back. As a result, the method is not spending time displaying empty video data. Accordingly, there is no visually perceptible gap during playback (when visually displaying the video feeds or when playing back the exported video file).

Figure 11:
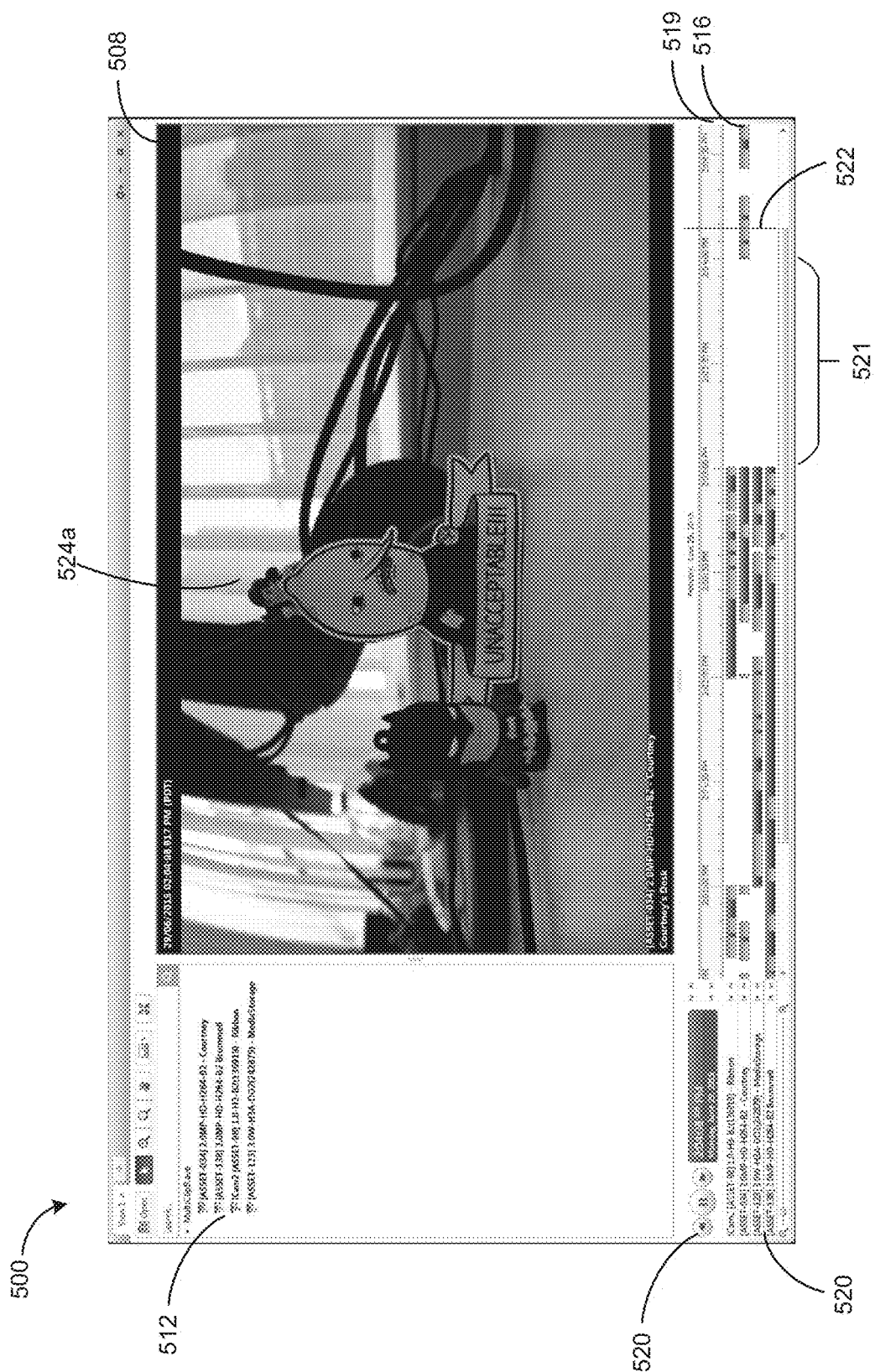
FIG. 11 illustrates a visual representation of a playback interface according to one example embodiment for playing back video data from the plurality of video feeds at a fourth example temporal position.

Referring now to FIG. 11, therein illustrated is a visual representation of a playback interface 500 for playing back video data from the plurality of video feeds at a fourth temporal position according to one example embodiment, wherein playback of video feeds has skipped temporally ahead over a gap in which no video of interest was available for playback. It will be appreciated that at temporal position "2:03:00 PM", the current temporal position arrived at temporal position in which all four video feeds had a break in video of interest. As a result, there is a temporal gap 521 after temporal position "2:03:00 PM" in which there was not any video of interest available for playback. Accordingly, after reaching the temporal position "2:03:00 PM", it was determined that the temporally nearest start in video of interest occurs within the second video feed at temporal position "2:04:00 PM". Accordingly, after reaching temporal position "2:03:00 PM", the playback of video feeds immediately skips to temporal position "2:04:00 PM", which corresponds to the next available video of interest of the second video feed. At "2:04:00 PM", video feed "Courtney" resumes video of interest. As a result, the playback layout is updated so that video data from this video feed may be played back within the display region 508.

According to various example embodiments, playback of each video feed is implemented using a state machine for that video feed. For example, a state machine is implemented for each of the video feeds to control the playback state of that video feed.

Figure 12:
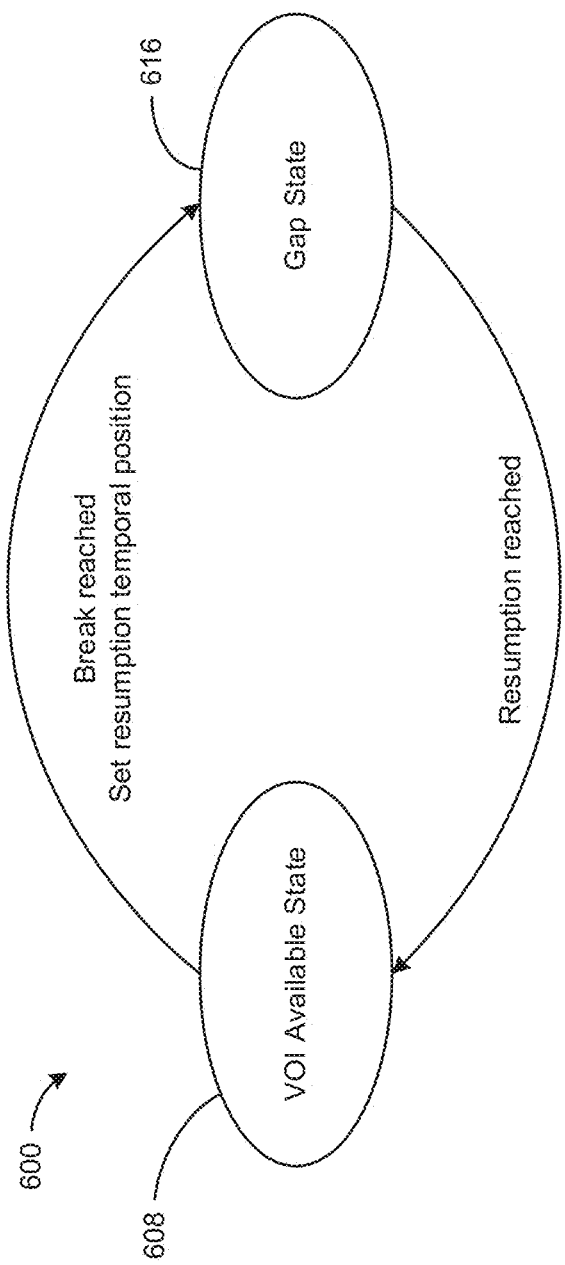
FIG. 12 illustrates a schematic diagram of a state machine for playing back a video feed according to one example embodiment.

Referring now to FIG. 12, therein illustrated is a schematic diagram of a state machine 600 for playback of a video feed. The state machine 600 consists essentially of a video of interest available state 608 and a gap state 616. The state machine 600 is in the video of interest available state 608 when video of interest is currently available for that video feed. In the video of interest available state 608, image data for the video feed is retrieved from the video storage module 248 and the image frame corresponding to the current temporal position is played back (e.g. visually displayed on the display device and/or included within an image frame of the exported video file).

According to some example embodiments, playing back a video feed when in the video of interest available state 608 may include buffering image data corresponding to temporal positions that are ahead in time of the current temporal position. Accordingly, playing back of the image frame corresponding to the current temporal position is carried out using image data from the buffering. As image frames of the video feed are played back, the frames are removed from the buffer and additional image frames corresponding to future temporal positions are added to the buffer.

According to some example embodiments, the image data of a video feed are stored contiguously within the video storage module 248. For example, image data corresponding to video of interest are stored as a logically continuous or logically contiguous data segments. Accordingly, breaks in the video of interest are not stored, which results in less storage space being required to store the image data of the video feed. Breaks in the video of interest are identified from metadata associated to the image data. For example, the metadata may identify that a first image frame of the video feed corresponds to an end of a video data segment. The metadata may also identify the temporal position of that first image frame. The metadata may further identify that a second image frame of the video feed corresponds to a start the next video data segment and the temporal position of that second image frame.

In some example embodiments wherein the image data of a video feed is stored contiguously, image data corresponding to both sides of a break of video of interest may be included in the buffered image data. That is, image data corresponding the end portion of a first video data segment and image data corresponding to the start portion of a subsequent video data segment may be included together in the buffer. Accordingly, the buffering of image data may be carried out with taking into account breaks in the video of interest.

The state machine 600 enters the gap state 616 when a break in the video of interest is reached during playback. For example, the reaching of the break in the video of interest may be determined by monitoring the metadata of the image frames being played back from the buffer to determine whether an image frame that corresponds to an end in a video data segment has been reached. Accordingly, in some example embodiments where the metadata of the image frames are monitored as the image frames are played back, the temporal position of video of interest becoming unavailable does not need to be determined ahead of the current temporal position.

When entering the gap state 616, a temporal position of the resumption of video of interest is determined. This may be determined by examining the metadata associated to the image frame within the buffer that identifies that frame as corresponding to a start in video of interest. In some embodiments, the temporal position of the resumption of video of interest is determined simply by examining the metadata associated to the next image frame within the buffer.

In the gap state 616, the current temporal position of playback of video feeds is monitored to determine whether the current temporal position has reached the temporal position of the resumption of video of interest. When the temporal position of the resumption of video of interest is reached, the state machine 600 returns to the video of interest available state 608. Playback of image data for the video feed may be resumed by playing back image data from the buffer for the video feed.

Figure 13:
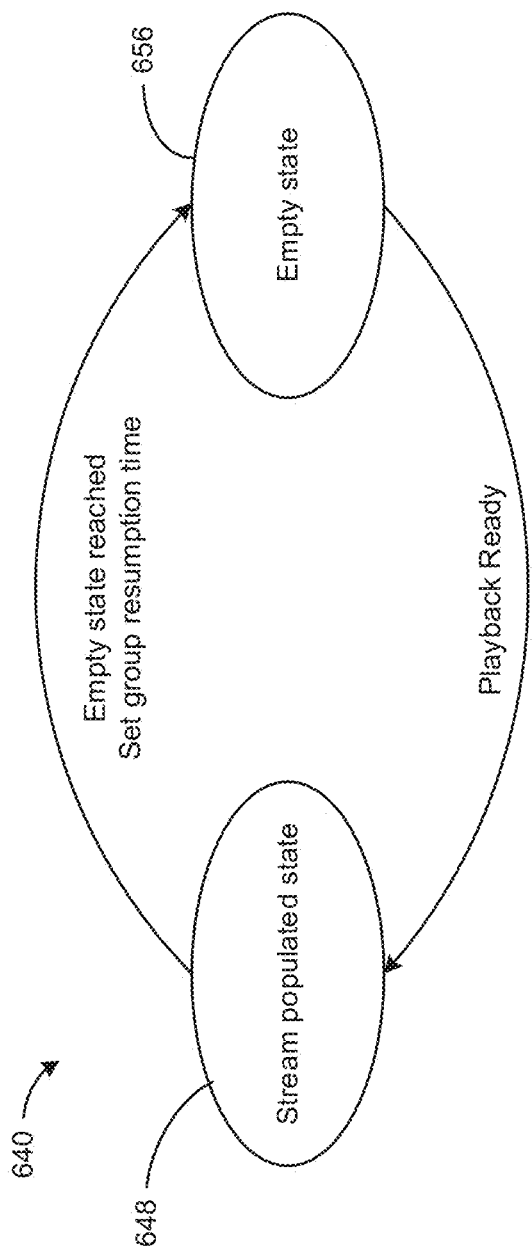
FIG. 13 illustrates a schematic diagram of a group state machine for maintaining synchronization of the plurality of video feeds selected for playback according to one example embodiment.

Referring now to FIG. 13, therein illustrated is a schematic diagram of a group state machine 640 for maintaining synchronization of the plurality of video feeds selected for playback. The group state machine 640 consists essentially of a stream populated state 648 and a stream empty state 656. The group state machine 640 is in the stream populated state 648 when the subset of currently available video feeds has at least one member. The group state machine 648 enters the stream empty state 656 when the subset of currently available video feeds becomes empty.

In the stream populated state 648, the playing back of video feeds is synchronized in time. Synchronization is maintained as the subset of currently available video feeds is updated through adding or removing of video feeds from the subset. For example synchronization is maintained by setting a current temporal position that is constantly advanced in time.

The group state machine 640 enters the stream empty state 656 when the subset of currently available video feeds is empty. For example, metadata associated to each of the video feeds may be monitored to determine when all of the video feeds of the group do not have video of interest available.

When entering the stream empty state 656, a group resumption temporal position corresponding to the temporally nearest start in video of interest within any one of the plurality of video feeds is determined. In the stream empty state 656, operations are carried out to prepare playback of video feeds from temporal positions corresponding to the group resumption position. For example, the current temporal position is advanced in time to the group resumption temporal position. The buffers for playing back each of the video feeds may be cleared and replaced with image data starting from the group resumption temporal position.

The group state machine 640 returns to the stream populated state 648 after operations for preparing playback from the group resumption temporal position are completed.

The system and method described herein according to various example embodiments allows for improved playing back of a plurality of video feeds at the same time. For example, the number of video feeds that has video of interest available at any given temporal position is tracked and a playback layout that is appropriate for that number of available video feeds is determined. By playing back the video feeds within the playback layout, only those video feeds that have available video of interest are displayed. This may lead to more efficient use of the area of the display region. For example, sub-regions of the display region are not left empty due to a video feed not having video of interest at a given temporal position. Furthermore, when played back within the playback layout, the area of the display region is used more efficiently to display those video feeds that have video of interest available.

While the above description provides examples of the embodiments, it will be appreciated that some features and/or functions of the described embodiments are susceptible to modification without departing from the spirit and principles of operation of the described embodiments. Therefore, the above discussed embodiments are considered to be illustrative and not restrictive, and the invention should be construed as limited only by the appended claims.

The invention claimed is:

1. A computer-implemented method for playing back a plurality of video feeds, the method comprising:

determining from the plurality of video feeds a subset of currently available video feeds;

determining a playback layout based on the number of the subset of currently available video feeds;

playing back the subset of currently available video feeds within the playback layout;

determining, based at least in part on information in metadata that indicates beginning or ending of a recorded video data segment, at least one change in availability in a given video feed of the plurality of video feeds;

updating the subset of currently available video feeds based on the at least one change, wherein the number of the updated subset of currently available video feeds is different than the number of the subset of currently available video feeds before the updating;

automatically updating the playback layout based on the number of the updated subset of currently available video feeds; and playing back the updated subset of currently available video feeds within the updated playback layout.

2. The method of claim 1, wherein determining the at least one change in availability in the given video feed of the plurality of video feeds comprises discovering the start of video of interest within the given video feed; and wherein updating the subset of currently available video feeds based on the at least one change comprises adding the given video feed to the subset of currently available video feeds.

3. The method of claim 2, wherein each of the plurality of video feeds comprises video intermittently recorded by a corresponding video capture device over an interval of time;

wherein video of interest corresponds to availability of recorded video; and wherein for a given temporal position within the interval of time, the one or more video feeds having video of interest at the given temporal position form the subset of currently available video feeds.

4. The method of claim 1, wherein determining the at least one change in availability in the given video feed of the plurality of video feeds comprises discovering a break in video of interest within the given video feed at a first temporal position; and wherein updating the subset of currently available video feeds based on the at least one change comprises removing at the first temporal position the given video feed from the subset of currently available video feeds.

5. The method of claim 4, wherein determining the at least one change in availability in the given video feed of the plurality of video feeds comprises discovering a resumption in video of interest within the given video feed at a second temporal position being later than the first temporal position; and wherein updating the subset of currently available video feeds based on the at least one change further comprises re-adding at the second temporal position the given video feed to the subset of currently available video feeds.

6. The method of claim 1, wherein determining at least one change in availability in the given video feed of the plurality of video feeds comprises discovering a break in video of interest within the given video feed at a first temporal position;

wherein updating the subset of currently available video feeds based on the at least one change comprises:

removing at the first temporal position the given video feed from the subset of currently available video feeds;

determining that the subset of currently available video feeds after the removing is empty;

determining a second temporal position corresponding to a temporally nearest start in video of interest within at least one of any one of the plurality of video feeds; and adding at the second temporal position the at least one video feed having the temporally nearest start in capturing of video to the subset of currently available video feeds; and wherein updating the playback layout based on the updated subset of currently available video feeds comprises choosing a matrix of display sub-regions corresponding to the number of available video feeds after the removing or the adding.

7. The method of claim 1, wherein each of the plurality of video feeds is associated to a metadata entry indicating a plurality of temporal positions of starts in video of interest for its associated video feed and a plurality of temporal positions of breaks in video of interest for its associated video feed.

8. The method of claim 1, wherein the playback layout defines a matrix of display sub-regions; and wherein playing back the currently available video feeds comprises playing back each currently available video feed within one of the display sub-regions.

9. The method of claim 8, wherein playing back the updated subset of currently available video feeds within the updated playback layout comprises visually displaying the currently available feeds according to the updated playback layout.

10. The method of claim 8, wherein playing back the updated subset of currently available video feeds according to the updated playback layout comprises populating sub-regions of the frame area of an exported video file with the currently available video feeds.

11. The method of claim 1, wherein at least one of the plurality of video feeds is associated to a respective at least one metadata entry indicating a plurality of temporal positions of starts in video of interest and a plurality of temporal positions of breaks in video of interest.

12. The method of claim 11, further comprising generating and displaying at least one graphical timeline respectively associated with the at least one of the plurality of video feeds from the respective at least one metadata entry for the at least one of the plurality of video feeds, wherein each of the at least one graphical timelines provides at least one graphical indicator of availability of video of interest within its associated video feed.

13. The method of claim 12, wherein indications of temporal positions of a beginning and an end of the video analytics detected event are provided on the at least one graphical timeline.

14. The method of claim 1, wherein the at least one change is determined ahead of a playback of the given video feed arriving at the at least one change.

15. A system for playing back a plurality of video feeds, the system comprising:

a processor;

a computer-readable storage device storing program instructions that when executed by the processor, cause the system to perform operations comprising:

determining from the plurality of video feeds a subset of currently available video feeds;

determining a playback layout based on the number of the subset of currently available video feeds;

playing back the subset of currently available video feeds within the playback layout;

determining, based at least in part on information in metadata that indicates beginning or ending of a recorded video data segment, at least one change in availability in a given video feed of the plurality of video feeds;

updating the subset of currently available video feeds based on the at least one change, wherein the number of the updated subset of currently available video feeds is different than the number of the subset of currently available video feeds before the updating;

automatically updating the playback layout based on the number of the updated subset of currently available video feeds; and playing back the updated subset of currently available video feeds within the updated playback layout.

16. The system of claim 15, wherein determining the at least one change in availability in the given video feed of the plurality of video feeds comprises discovering the start of video of interest within the given video feed; and wherein updating the subset of currently available video feeds based on the at least one change comprises adding the given video feed to the subset of currently available video feeds.

17. The system of claim 16, wherein each of the plurality of video feeds comprises video intermittently recorded by a corresponding video capture device over an interval of time;

wherein video of interest corresponds to availability of recorded video; and wherein for a given temporal position within the interval of time, the one or more video feeds having video of interest at the given temporal position form the subset of currently available video feeds.

18. The system of claim 15, wherein determining the at least one change in availability in the given video feed of the plurality of video feeds comprises discovering a break in video of interest within the given video feed at a first temporal position; and wherein updating the subset of currently available video feeds based on the at least one change comprises removing at the first temporal position the given video feed from the subset of currently available video feeds.

19. The system of claim 18, wherein determining the at least one change in availability in the given video feed of the plurality of video feeds comprises discovering a resumption in video of interest within the given video feed at a second temporal position being later than the first temporal position; and wherein updating the subset of currently available video feeds based on the at least one change further comprises re-adding at the second temporal position the given video feed to the subset of currently available video feeds.

20. The system of claim 15, wherein determining at least one change in availability in the given video feed of the plurality of video feeds comprises discovering a break in video of interest within the given video feed at a first temporal position;

wherein updating the subset of currently available video feeds based on the at least one change comprises:

removing at the first temporal position the given video feed from the subset of currently available video feeds;

determining that the subset of currently available video feeds after the removing is empty;

determining a second temporal position corresponding to a temporally nearest start in video of interest within at least one of any one of the plurality of video feeds; and adding at the second temporal position the at least one video feed having the temporally nearest start in capturing of video to the subset of currently available video feeds; and wherein updating the playback layout based on the updated subset of currently available video feeds comprises choosing a matrix of display sub-regions corresponding to the number of available video feeds after the removing or the adding.

21. The system of claim 15, wherein each of the plurality of video feeds is associated to a metadata entry indicating a plurality of temporal positions of starts in video of interest for its associated video feed and a plurality of temporal positions of breaks in video of interest for its associated video feed.

22. The system of claim 15, wherein the playback layout defines a matrix of display sub-regions; and wherein playing back the currently available video feeds comprises playing back each currently available video feed within one of the display sub-regions.

23. The system of claim 22, wherein playing back the updated subset of currently available video feeds within the updated playback layout comprises visually displaying the currently available feeds according to the updated playback layout.

24. The system of claim 22, wherein playing back the updated subset of currently available video feeds according to the updated playback layout comprises populating sub-regions of the frame area of an exported video files with the currently available video feeds.

25. The system of claim 15, wherein at least one of the plurality of video feeds is associated to a respective at least one metadata entry indicating a plurality of temporal positions of starts in video of interest and a plurality of temporal positions of breaks in video of interest.

26. The system of claim 25, wherein the operations further comprise generating and displaying at least one graphical timeline respectively associated with the at least one of the plurality of video feeds from the respective at least one metadata entry for the at least one of the plurality of video feeds, wherein each of the at least one graphical timelines provides at least one graphical indicator of availability of video of interest within its associated video feed.

27. The system of claim 26, wherein indications of temporal positions of a beginning and an end of the video analytics detected event are provided on the at least one graphical timeline.

28. The system of claim 15, wherein the at least one change is determined ahead of a playback of the given video feed arriving at the at least one change.

* * * * *